United States Patent Office 3,423,453
Patented Jan. 21, 1969

3,423,453
PROCESS FOR THE MANUFACTURE OF LIGHT-COLORED OLEFIN SULFONATION PRODUCTS OR OF THE CORRESPONDING SULFONATES
Horst Baumann, Hilden, Rhineland, and Werner Stein, Erkrath-Unterbach, Germany, assignors to Henkel & Cie G.m.b.H., Dusseldorf-Holthausen, Germany, a corporation of Germany
No Drawing. Filed Jan. 7, 1965, Ser. No. 424,143
Claims priority, application Germany, June 25, 1964, H 53,088; Aug. 24, 1964, H 53,620
U.S. Cl. 260—513          13 Claims
Int. Cl. C07c 139/00, 143/02

ABSTRACT OF THE DISCLOSURE

There is disclosed a process for the sulfonation of $C_8$–$C_{22}$ olefins to produce olefin sulfonates characterized by their light color, the process being carried out in two stages. In the first stage, the $C_8$–$C_{22}$ olefin is reacted at a temperature of 0–50° C. with an $SO_3$-inert gas mixture containing 0.5–10 volume-percent $SO_3$ until that point at which the ratio of the amount of $SO_2$ being liberated and the amount of $SO_3$ simultaneously being absorbed by the olefin amounts to from 1.5–2.5 times the ratio of $SO_2$:$SO_3$ calculated for that point in the reaction corresponding to an absorption of 0.5 mols of $SO_3$ per mol of olefin. Thereafter in a second stage the sulfonation reaction mixture from the first stage is contacted at a reduced temperature of from —10 to 40° C. with an $SO_3$-inert gas mixture containing the $SO_3$ in an amount equal to at the most 80% of the concentration employed in the first stage. The $SO_3$ inert gas mixture is further used at a feed rate which is at least 20% higher than that employed in the first stage, the reaction being continued until at least 90% of the olefins originally charged have been sulfonated.

This invention relates to the sulfonation of olefins, more particularly the invention relates to a process for the manufacture of light colored olefin sulfonates by a multi-stage sulfonation process and the products obtained thereby.

U.S. Patents 2,061,617 to 2,061,620, and 2,094,451 have disclosed processes for sulfonating olefins by means of strong sulfonating agents such as oleum, chlorosulfonic acid and sulfur trioxide in the presence of solvents and then subjecting the reaction product to hydrolysis. These processes, however, have a number of disadvantages. For example, when oleum or chlorosulfonic acid are used, unsatisfactory degrees of sulfonation of less than 90% are obtained. Sulfonates with a high unsulfonated content are undesirable in the manufacture of washing or cleansing agents. It is difficult to process them in spray towers, and they do not display a satisfactory cleaning effect. Separation of the unreacted olefin from the sulfonate also involves additional manufacturing expense. When oleum is used, the reaction mixture, after sulfonation, contains considerable amounts of unreacted sulfuric acid, which results in high alkali consumption in subsequent neutralization and alkaline hydrolysis steps and a consequent high salt content in the end product. The use of chlorosulfonic acid as a sulfonating agent furthermore results in very dark colored sulfonates.

If the olefins are sulfonated with the substantially stronger acting, free sulfur trioxide without special precautions, the sulfonation products occur as viscous, brownish black masses which are but limitedly suitable for further commercial or technical use. In both the processes disclosed by the above-cited United States patents, and in the report in the Journal of the American Chemical Society, volume 76 (1954), page 3952, the sulfonation with sulfur trioxide is disclosed as always being conducted in the presence of inert solvents, and both stress that, in the absence of the solvents, a decomposition or polymerization of the olefin takes place. The recovery of the used solvent, which always entails lossses and additional expense, and the necessity of relatively large liquid throughputs in the sulfonation, make the described processes doubtfully economical.

It is therefore an object of the invention to overcome the difficulties of the prior art. More specifically it is an object of the invention to provide a method for sulfonating an olefin to an extent greater than 90% by sulfonating agents other than oleum and without the use of solvents. It is a further object of this invention to provide a sulfonation product initially having relatively lighter color as compared to those compounds prepared by prior art methods.

These and other objects have been achieved by the discovery that olefins containing 8 to 22 carbon atoms can be transformed into light colored olefin sulfonation products by sulfonation with gaseous sulfur trioxide diluted with inert gas, if sulfonation is performed in two stages, the sulfonation being performed in the first stage at temperatures comprising 0 to 50° C. and an $SO_3$ concentration in inert gas comprising 0.5 to 10% by volume until the ratio of the amount of sulfur dioxide being liberated and the amount of sulfur trioxide being simultaneously taken up by the starting material comprises 1.5 to 2.5 times the ratio computed for the moment of an absorption of 0.5 mol of $SO_3$ per mol of olefin, and the sulfonation is then continued in a second stage until the olefins present in the starting material are at least 90% sulfonated, the sulfonation in the second stage being performed at reduced temperatures comprising —10 to +40° C., at a sulfur trioxide concentration of at most 80% and preferably 20 to 70% of that used in the first stage, and at a rate of sulfur trioxide feed that is at least 20% and preferably more than 25% higher than in the first stage. The sulfonation products thus obtained are then preferably hydrolyzed and/or neutralized.

The new technical teaching of the invention is to be considered as the result of hitherto undisclosed discovery relating to the sulfonation of olefins with gaseous sulfur trioxide. Although applicants do not wish to be limited by any theory, it is believer according to the present invention that the following best explains this discovery: if an olefin is sulfonated with an inert gas stream containing sulfur trioxide, the exhaust gas contains small amounts of sulfur dioxide. The ratio of the amount of sulfur dioxide formed during the sulfonation to the amount of the sulfur trioxide that is simultaneously taken up by the olefin is at first constant, assuming that the experimental conditions remain the same, such as temperature, $CO_3$ concentration in the inert gas fed in, and the amount of $CO_3$ fed in per unit of time. When the sulfonation has reached a certain degree, which is generally greater than that which corresponds to an absorption of 0.5 mol of $SO_3$ per mol of olefin, the numerical value of the above-defined ratio suddenly increases to a multiple of the initial value, and again becomes constant when a value is reached which may amount to from 10 to 30 times the initial value. The applicants have made the discovery that light colored olefin sulfonation products can be obtained if, when this change in the numerical value of the ratio of the amount of sulfur dioxide formed to the amount of the sulfur trioxide simultaneously absorbed occurs, one switches to the second sulfonation stage in which the sulfonation conditions as regards the sulfonation temperature, the $SO_3$ concentration of the inert gas being fed in, are appropriately modified in relation to the first stage.

The sulfonation is performed continuously or discontinuously, without the use of inert solvents. If the process is continuous, the two stages of sulfonation can be additionally divided into a plurality of reaction zones.

The inert gases for the mixture of $SO_3$ and inert gas serving as the sulfonating agent are preferably air or nitrogen, although other inert gases are also suitable, such as carbon dioxide for example. The sulfur trioxide concentration in the gaseous sulfonating agent ranges from 0.5 to 10 and preferably from 1 to 8 percent by volume, in the first stage.

In the first sulfonation stage, the reaction temperature may be from 0 to 50° C. and preferably from 10 to 40° C.

The reaction between the sulfur trioxide and the olefin takes place very rapidly, the speed being limited only by the ability of the apparatus to carry off the heat that evolves. If no provision is made for an intensive mixing of the reactants by means of mechanical devices, the reaction time generally amounts to about 5 to 120 minutes. When reactors are used which provide for an inate agitation of the reactants, such as reactors operating by the laminar flow or spray process, this time can be considerably shortened.

The numerical values of the $SO_2:SO_3$ ratio defined above are computed from the amount of the sulfur trioxide absorbed by the olefin and the amount of the sulfur dioxide carried out by the inert gas. These figures can be determined both in the case of continuous processes and in the case of discontinuous processes by means of generally known methods of analysis and measuring and regulating processes. The amount of the sulfur trioxide absorbed by the olefin can be measured, for example, simply by determining the weight gained by the starting material or by measuring the amounts of sulfur trioxide carried in and carried out by the sulfonating gas.

The measurement of the liberated sulfur dioxide in the exhaust gas from the first reaction stage can be performed by known analytical methods. Most simply, it consists in an iodometric titration of an aqueous absorption solution through which the exhaust gas or a partial current of same has been passed during a certain amount of time. More advantageous are analysis methods based, for example, on the measurement of the infrared absorption solution through which the exhaust gas or a partial current of same has been passed during a certain amount of time. More advantageous are analysis methods based, for example, on the measurement of the infrared absorption of the gas, or on an electrochemical titration of an absorption solution that is in contact with the gas.

A method for the simultaneous and continuous determination of both the sulfur dioxide and the sulfur trioxide in gases has proven particularly expedient. It is based upon the ultraviolet spectroscopic determination of both gases at the wavelengths of 238 and 285 millimicrons.

In the technical application of the process, it is not necessary constantly to determine the numerical value of this ratio. It is often sufficient to determine by preliminary experiments the operating conditions which are required in order to follow the technical teaching of the invention, and limit one's self to occasional verifications of the $SO_2:SO_3$ ratio.

In the second sulfonation stage, the temperature is to be lower than that of the first stage, and is to amount to from −10 to +40° C., and preferably from 0 to 30° C. The sulfur trioxide concentration in the inert gas must amount to a maximum of 80%, and preferably to 20% to 70% of the concentration used in the first stage. Furthermore, the rate at which the sulfur trioxide is fed in is to be increased by at least 20%, and preferably by more than 25%, over the rate used in the first stage, thus shortening the time during which the sulfonating agent works upon the partially sulfonated olefin, or shortening its time of stay in the second stage, as the case may be, and substantially preventing the formation of strongly colored by-products. This can be achieved in a continuous process by increasing the throughput in the second sulfonation stage.

The sulfonation is continued under the above-stated conditions until the degree of sulfonation amounts to at least 90% of the olefin, i.e., the olefins originally present, after hydrolysis and neutralization with alkalis, if necessary, have become at least 90% water-soluble. Generally 1.1 to 1.5 and preferably 1.15 to 1.35 mols of sulfur trioxide are needed per mol of olefin for this purpose. If one starts with technically pure olefins, products can easily be manufactured with higher degrees of sulfonation, of, for example, at least 92%, and especially of more than 94%, so that separation of the unsulfonated products is unnecessary.

The color of the olefin sulfonates can be still further improved by subjecting the olefin, prior to sulfonation, to a treatment with adsorption agents, such as aluminum oxide, bleaching earths, fuller's earths or bentonites. It has also proven advantageous to add such adsorption agents, especially acid bleaching earths, to the olefin in amounts of 0.1 to 5%, the adsorption agent remaining in the sulfonation mixture during the sulfonation and being removed by filtration or centrifugation only after the hydrolysis. By this preliminary treatment with adsorption agents, or by the addition of the adsorption agents, certain presently still unknown accompanying substances which originate in the manufacture of the olefins are removed, which otherwise can lead to a darkening of the reaction mixture that occurs right at the commencement of the sulfonation.

The monoolefins which serve as starting materials, comprising 8 to 22, preferably 10 to 20, and especially 12 to 18 carbon atoms in the molecule, or their mixtures, may be straight chained or branched, and may also contain cycloaliphatic groups, providing the two double-bonded carbon atoms are not the starting point of a chain branching. These olefins, which can be made in any desired manner, e.g., by the cracking of petroleum hydrocarbons, the dehydrohalogenation of alkylhalides or by ethylene polymerization, do not have to be entirely pure, i.e., they may contain diolefins in small amounts of not more than 10%, and preferably less than 5%, of the olefin content. Olefin mixtures with at least 15 weight percent, and preferably at least 40 weight percent monoolefins with a double bond at an inside position are preferred.

The exact structure of the sulfonated olefins obtained is not known except in terms of the physical properties obtained and the steps involved in the method of manufacture both of which are held to extremely close limits by the present invention thereby permitting substantial duplication of the product from reaction to reaction.

For hydrolysis, the crude sulfonation products can be heated in the conventional manner with water and acid or alkali to temperatures of 80 to 100° C., using enough water to create a 10 to 75% solution of the crude sulfonation product. Usually 2 to 4 hours are needed for a hydrolysis at 100° C. If an acid medium is used, the amounts of sulfuric acid present in the crude sulfonation product generally suffice; if necessary some more acid, preferably sulfuric acid, can be added. If the hydrolysis is done in alkaline solution, so much alkali is added that, after the saturation of the excess sulfonating agent, enough alkali is available for the neutralization of the sulfonic acid that forms during the hydrolysis. It is expedient to work with an excess, which can amount to as much as 20% of the theoretically necessary amount of alkali. The hydroxides, carbonates or bicarbonates of sodium, potassium, magnesium or calcium, or organic bases such as the primary, secondary or tertiary amines or alkyloamines with 1 to 4, and preferably 2, carbon atoms per alkyl or alkylol radical are used as alkalis.

If the hydrolysis is performed in the above-stated manner, a sulfonate mixture is obtained which consists mostly, i.e., 60 to 80%, of hydroxyalkanesulfonates (Formula Examples I and II) and to a lesser extent of alkene sulfonates (Formula Examples III and IV):

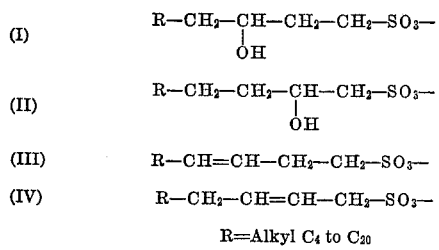

(I)    $R-CH_2-CH-CH_2-CH_2-SO_3-$
                $|$
                $OH$ (II)   $R-CH_2-CH_2-CH-CH_2-SO_3-$
                    $|$
                    $OH$ (III)  $R-CH=CH-CH_2-CH_2-SO_3-$ (IV)   $R-CH_2-CH=CH-CH_2-SO_3-$

R=Alkyl $C_4$ to $C_{20}$

Individual sulfonates may also be produced.

It has developed that the alkene sulfonates are superior to the hydroxyalkanesulfonates for use in washing agents as regards their solubility and detergent properties. The percentage of the alkenesulfonates can be increased substantially by performing the hydrolysis at elevated temperature, under pressure, in an acid medium. In this preferred procedure, the crude olefin sulfonation products are heated under pressure to temperatures above 150° C., and preferably of 160 to 200° C., in a 10 to 80% aqueous solution with a pH of 0 to 3. In the said temperature range the complete hydrolysis takes only 5 to 30 minutes. On the other hand, an alkaline hydrolysis performed under equal conditions results in no appreciable increase of the percentage of alkenesulfonates.

The acid hydrolysis at elevated temperature has the additional advantage that it increases the total yield of water-soluble olefin sulfonate above that of hydrolysis at 100° C., which is probably to be attributed to the hydrolysis of difficultly saponifiable residual substances which takes place exclusively at elevated temperature. These substances which are unsaponifiable at 100° C., and which can be separated, for example, by extracting the aqueous solution with organic solvents that are not miscible with water, are normally of no benefit to the washing process.

Following the acid hydrolysis, the olefin sulfonic acids can be neutralized using the previously named alkalies, alkaline earths or organic bases. The aqueous solutions of the olefin sulfonic acid salts are light in color and can be used directly or further processed in a conventional manner.

If a still lighter colored sulfonation product is desired for specific purposes, a bleaching treatment can be performed with oxygenous bleaches. Since the olefin sulfonates obtained by the process of the invention contain but few colored by-products, they are characterized by a good bleachability and a low bleach consumption. The hydrolysis and bleaching can also be undertaken simultaneously.

The following non-limiting examples are given as certain preferred embodiments of the invention and are not to be construed as narrowing the scope of the novel and inventive method and composition of the applicants.

In the following examples, a specimen of the hydrolyzed and neutralized mixture was extracted 4 to 5 times with the aliquot amount of benzine, a petroleum hydrocarbon with a boiling point of 80 to 110° C., in order to determine the content of water-soluble olefin sulfonate. After the extractant had been removed by distillation, the remaining unsulfonated oil was weighed. The color values given were determined on a basis of 5% aqueous solutions of the sulfonates in a 4″ cell in the Lovibond tintometer. Any unsulfonated amounts that were present were not figured as sulfonate.

Example 1

Six hundred and seventy five grams (3 mols) of an olefin with 16 carbon atoms in the molecule, an iodine number of 115, a content of 51% inside olefin and 47% terminal olefin was sulfonated with an $SO_3$-air mixture containing 2 vol. percent of $SO_3$, in a reaction vessel with a 3-liter capacity which was equipped with a gas feed tube reaching to the floor of the vessel, and with an exhaust pipe. The temperature was held to 28° C. by external cooling. During the sulfonation, the weight gain of the sulfonation product was measured from time to time; at the same time, the acid components present in the exhaust gas were washed out with lye. After a weight increase had been achieved in the course of the sulfonation which corresponded to an absorption of 0.5 mol of $SO_3$ per mol of olefin, the amount of the sulfur dioxide that had formed by that time was determined. From this amount and the weight gain of the olefin the molar ratio of $SO_2$ to $SO_3$ was computed to be 0.041. The sulfonation was then continued with an occasional determination of the molar ratio of $SO_2$ to $SO_3$. After the olefin had, in the course of 45 minutes, absorbed 216 g. of $SO_3$, corresponding to 0.9 mol of $SO_3$ per mol of olefin, and the $SO_2$:$SO_3$ ratio, which had been constant for a long period of time, had risen to a value of 0.098, the working conditions applying to the second sulfonation stage were established—that is, 96 grams of $SO_3$, corresponding to 0.4 mol of $SO_3$ per mol of olefin, was introduced into the mixture in a concentration of 1% of the sulfonating gas by volume, at a temperature of 24° C. and within a period of 15 minutes. In the second sulfonation stage, the $SO_2$:$SO_3$ ratio was no longer determined. The rate of $SO_3$ feed amounted in the first stage to 4.8 g. per minute, and to 6.4 g. per minute in the second stage. In all, 1.3 mols of $SO_3$ had been absorbed per mol of olefin.

The sulfonation product obtained was diluted with 1.1 times the molar amount of 10% caustic soda solution, and then hydrolyzed by three hours of boiling with a reflux condenser. The sulfonation degree of the product amounted to 94.2%. A 5% solution of the hydrolyzed olefin sulfonate produced the following values in the Lovibond tintometer (4″ cell): yellow 21; red 9.8; blue 0.

To demonstrate the technical effect as compared with a one-stage procedure that is not being claimed, the same olefin was sulfonated in the above-described apparatus with 1.3 times the molar amount of $SO_3$ in a 3% dilution with air, at a temperature of 29° C., all the way through, without determining the $SO_2$ content. The reaction time was also one hour in this case. The degree of sulfonation was only 89.8%, and the color numbers of the hydrolyzed olefin sulfonate in 5% solution ran beyond the range of the tintometer (yellow >27, red >27, blue >27).

Example 2

For the performance of the experiments an apparatus was used which consisted of a proportioning device and three graduated reaction vessels of a capacity of about 5 liters arranged in tandem. Each of the three vessels was equipped with two tubes reaching to the bottom of the vessel, one of which served to feed in the material to be sulfonated and the other to feed in the gas, and with an exhaust pipe and an overflow pipe. The depth to which the individual vessels were filled could be varied from 2 to 4 liters by means of the overflow pipes. The vessels were arranged so that the partially sulfonated mixture coming from the overflow pipe of Vessel 1 could flow into Vessel 2, and run from the latter in like manner into Vessel 3. The fully sulfonated mixture was withdrawn from the overflow tube of Vessel 3. Vessels 1 and 2 constituted the first sulfonation stage, and Vessel 3 the second sulfonation stage.

The starting material was a mixture of olefins with 15 to 18 carbon atoms in the molecule (average chain length $C_{16.5}$) and with an iodine number of 119.5. It consisted of 91% inside and 6% terminal olefins, plus a small amount of paraffins and diolefins. The apparatus described above was filled with these olefins and the content of Vessel 1 was adjusted to 4 liters. Then 11.8 kilograms of olefin (50 mols) per hour, corresponding to 15 liters of olefin per hour, were continuously fed into Vessel 1 through the proportioning device. At the same time a stream of air containing 2 vol. percent $SO_3$ was fed into the first stage (Vessels 1 and 2), and another air stream containing 1 vol. percent $SO_3$ was fed into the second stage (Vessel 3). Whereas 50 mol percent of $SO_3$, with reference to the olefin, was used in the first vessel, the filling depth of Vessels 2 and 3 and the amount of $SO_3$ and air fed into them was varied step by step until an exhaust gas analysis by means of an automatically indicating apparatus showed, at the point of transition from the 2nd to the 3rd vessel, that 0.087 mol of sulphur dioxide had been released per mol of sulfur trioxide absorbed. This is approximately 2.3 times the value of the $SO_2:SO_3$ ratio of 0.037 mol of $SO_2$ per mol of $SO_3$ found in the exhaust gas from the 1st vessel, i.e., after the absorption of 0.5 mol of $SO_3$ per mol of olefin. The amount of $SO_3$ in relation to olefin amounted in this case to 44 mol percent in the 2nd vessel and to 37 mol percent in the 3rd vessel for a liquid content in Vessels 2 and 3 of 3.5 and 2.2 liters, respectively. During the entire experiment, a temperature of 26° C. was maintained in the 1st reaction vessel, 24° C. in the 2nd, and 18–20° C. in the 3rd, by means of appropriate cooling. The average time of stay of the reaction mixture in the first stage amounted to 30 minutes, and in the second stage to 9 minutes. The rate of sulfur trioxide feed was 32% higher in the second stage than it was in the first.

The product running from the final vessel, after removing the first runnings, which were disregarded, was diluted with twice the amount of water and then hydrolyzed by three hours of heating at 100° C. In the autoclave at 190° C. the hydrolysis of a specimen for comparison purposes took only 15 minutes. The total water-soluble olefin sulfonate content of the specimens saponified at 100° C. amounted to 92.1%, with an alkene sulfonate percentage of 38%, while the specimen hydrolyzed at 190° C. contained 94.3% water-soluble olefin sulfonates and more than 75% alkenesulfonate. A 5% solution of the hydrolyzed and neutralized olefin sulfonate produced the following color values in the Lovibond tintometer, independently of the hydrolysis temperature: yellow 19, red 8.9, blue 0.

In an experiment for comparative purposes using single-stage sulfonation, a reaction vessel with a capacity of 7.5 liters, as described above, was filled with the same olefin and fed hourly with 15 liters of it, corresponding to 11.8 kilograms (50 mols). The sulfonation was carried out with a 1.3× molar excess (with reference to olefin) of $SO_3$ in a 3 volume-percent mixture with air. The temperature was 28° C., the average time of stay of the olefin 30 minutes and the sulfonation degree 90.8%. The amount of sulfur dioxide formed, in proportion to the amount of sulfur trioxide absorbed, amounted at first to 0.037 mol of $SO_2$ per mol of $SO_3$, and rose, after passing the critical range, to 0.43 mol of $SO_2$ per mol of $SO_3$. After the hydrolysis a dark-colored sulfonate was obtained, whose color numbers in a 5% solution ran beyond the range of the tintometer (yellow>27, red>27, blue>27).

The following two comparative experiments are intended to describe the difference between the process of the invention and a process which has not been described in the literature, but which is outside of the scope of this invention. In both cases, the arrangement described in Example 2 was retained, but the reaction conditions were modified to the effect that the transition to the second stage took place at a different time than that specified according to the invention. In Experiment a, it took place later than the specified time, and in Experiment b it took place before the specified time. In both cases, the $SO_2:SO_3$ ratio after absorption of 0.5 mol of $SO_3$ per mol of olefin amounted in the 1st vessel to 0.038 mol of $SO_3$ per mol of $SO_2$. 15 liters, corresponding to 11.8 kilograms of olefin were put through hourly as in Example 2, with an average time of stay of 39 minutes, and with an $SO_3$ concentration in the sulfonation gas of 2% in the first stage and 1% in the second.

(a) The transition to the 2nd stage (Vessel 3) took place when the $SO_2:SO_3$ ratio had already risen to more than 0.13, i.e., to more than 2.5 times the basic value of 0.038. The following quantities of sulfur trioxide were used (with reference to olefin):

| Vessel | Mol percent |
|---|---|
| 1 | 50 |
| 2 | 60 |
| 3 | 20 |

The hydrolysis was performed in the manner described in Example 2. The degree of sulfonation amounted to 90.7% at a hydrolysis temperature of 100° C., and to 92.9% at a hydrolysis temperature of 160° C. The following Lovibond color numbers were obtained with a 5% solution of the hydrolyzed olefin sulfonate: yellow 27, red 25, blue 2.3.

(b) The transition to the 2nd sulfonation stage took place immediately after Vessel 1, that is, at a time when the increase in the $SO_2:SO_3$ ratio was below the lowermost limit of 1.5 claimed for the invention. Since a total of 80 mol percent of $SO_3$ came into use in the second stage, the time of stay and, due to the increase in the heat of reaction, the sulfonation temperature, too, were both more than they were in the first stage. The sulfonation degree of the sulfonate hydrolyzed at 100° C. amounted to 90.8%, the color numbers of the 5% solution being beyond the range of the tintometer.

In comparison with the examples according to the invention, considerably darker colored olefin sulfonates were obtained in all comparative tests, with lower degrees of sulfonation. The strong discoloration of the products made for comparative purposes is particularly expressed by the increase in the red and blue values.

Example 3

In the following example, the same starting materials and working conditions were used as in Example 1, except that, prior to the commencement of the sulfonation, 30 grams (4.5 wt. percent) of an acidly activated bleaching earth ("Tonsil") were added to the olefin. After the sulfonation, and after hydrolysis by three hours of heating at 100° C. in the presence of caustic soda solution, the adsorbing agent was removed by centrifuging the aqueous olefin sulfonate solution.

The degree of sulfonation amounted to 94.6%. The following color values were measured with the Lovibond tintometer (the color values from Example 1 are shown between parentheses):

Yellow (21) _____ 16
Red (9.8) _____ 6.7
Blue (0) _____ 0

Thus, there has been described a novel inventive and useful process for the sulfonation of 8 to 22 carbon atom olefins by $SO_3$ in a two-step process where in the first step sulfonation is carried out until the ratio of the amount of $SO_2$ being liberated and the amount of $SO_3$ being simultaneously taken up by the starting material comprises 1.5 to 2.5 times the ratio computed for the moment of absorption of 0.5 mol of $SO_3$ per mol of olefin and the sulfonation continued in a second stage at reduced temperatures and $SO_3$ concentration until the olefin is sulfonated to the extent of at least 90%. The products obtained thereby are comparatively lighter in color as compared to materials prepared by prior art methods and as such are novel inventive and useful compositions that may be employed as washing or cleansing agents and in equivalent applications.

Although the invention has been described with reference to certain preferred embodiments, it is not the intention of the applicants to be limited thereby and certain obvious modifications of the novel process and composition are intended to be included within the broad scope of the invention as embodied in the following claims.

What is claimed is:

1. Process for the sulfonation of C8–C22 olefins which comprises reacting a C8–22 olefin or mixture thereof in a first stage at a temperature of 0–50° C. with an $SO_3$-inert gas mixture containing 0.5–10 volume-percent $SO_3$, effecting said reaction until the ratio of the quantity of $SO_2$ being liberated and the quantity of $SO_3$ simultaneously being absorbed by the olefin amounts to from 1.5–2.5 times the ratio of $SO_2:SO_3$, calculated for that point in the reaction corresponding to an absorption of 0.5 mols of $SO_3$ per mol of olefin, thereafter contacting the sulfonation reaction mixture from said first stage in a second stage at a reduced temperature of −10 to 40° C. with an $SO_3$-inert gas mixture containing the $SO_3$ in an amount equal to at the most 80% of a concentration used in the first stage, employing a feed rate for said $SO_3$-inert gas mixture that is at least 20% higher than that employed in said first stage and continuing said reaction until at least 90% of the olefins originally charged are sulfonated.

2. Process according to claim 1 wherein said $SO_3$-inert gas mixture used in said second stage contains $SO_3$ in an amount of from 20 to 70% of the concentration used in said first stage.

3. Process according to claim 1 wherein said $SO_3$-inert gas mixture is employed in said second stage at a feed rate which is 25% higher than that employed in said first stage.

4. Process according to claim 1 wherein a total of 1.1–1.5 mols of sulfur trioxide per mol of olefin is employed in said reaction.

5. Process according to claim 1 wherein a total of 1.2 to 1.4 mols of sulfur trioxide per mol of olefin is employed in said reaction.

6. Process according to claim 1 wherein said $SO_3$-inert gas mixture employed in said first stage as a concentration of $SO_3$ amounts to from 1 to 8 volume percent.

7. Process according to claim 1 wherein said first stage is effected at a temperature of from 10 to 40° C. and said second stage is effected at a reduced temperature with respect to said first stage of from 0–30° C.

8. Process according to claim 1 wherein said olefins employed in said reaction comprise at least 15 wt. percent of monoolefins having an internally located double bond and having a chain length of 10 to 20 carbon atoms.

9. Process according to claim 1 wherein said olefins employed in said reaction comprise at least 40 wt. percent of monoolefins having an internally located double bond and having a chain length of 10 to 20 carbon atoms.

10. Process according to claim 1 wherein said first sulfonation stage is effected in from 1 to 10 successively arranged reaction zones and said second sulfonation stage is effected in from 1 to 3 successively arranged reaction zones.

11. Process according to claim 1 which comprises employing as starting olefins which have been previously subjected to treatment with at least one adsorption agent selected from the group consisting of aluminum oxide, bleaching earths, fuller's earth and bentonites.

12. Process according to claim 11 wherein said adsorption agent is employed in a quantity of from 0.1 to 5% referred to the olefin.

13. Process according to claim 1 which comprises the additional step of heating the sulfonation products recovered from said second stage in the form of a 10 to 80% aqueous solution thereof having a pH of from 0 to 3 under elevated pressure at a temperature of from 150 to 200° C.

References Cited

UNITED STATES PATENTS

| | | | |
|---|---|---|---|
| 2,061,617 | 11/1936 | Downing et al. | 260—513 |
| 2,278,064 | 3/1942 | De Simo et al. | 260—513 |
| 3,084,186 | 4/1963 | Clippinger | 260—513 |
| 3,164,608 | 1/1965 | Blaser | 260—327 |
| 3,164,609 | 1/1965 | Voss et al. | 260—327 |
| 3,200,140 | 8/1965 | Sowerby | 260—505 |
| 3,235,549 | 2/1966 | Broussalian | 260—513 |

DANIEL D. HORWITZ, *Primary Examiner.*